Figures 1, 2, 3, 4:
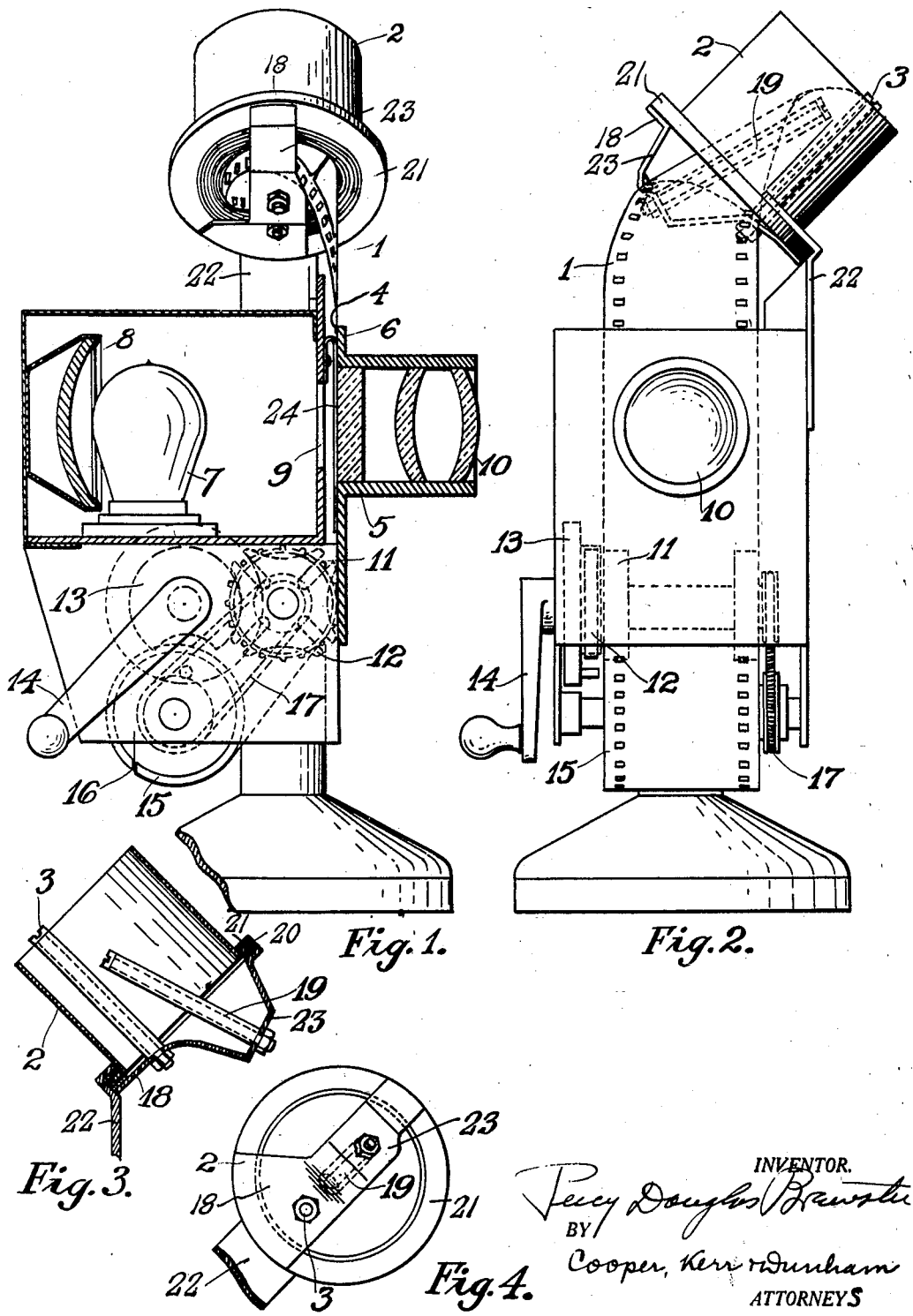

April 12, 1927. 1,624,156
P. D. BREWSTER
FILM PROJECTOR
Filed March 2, 1925

INVENTOR.
Percy Douglas Brewster
BY Cooper, Kerr & Dunham
ATTORNEYS

Patented Apr. 12, 1927.

1,624,156

UNITED STATES PATENT OFFICE.

PERCY DOUGLAS BREWSTER, OF EAST ORANGE, NEW JERSEY, ASSIGNOR TO WYKO PROJECTOR CORPORATION, A CORPORATION OF NEW YORK.

FILM PROJECTOR.

Application filed March 2, 1925. Serial No. 12,511.

My invention relates to a projector adapted to project singly a series of pictures printed on a strip of film, usually corresponding in size to the standard motion picture film, and usually from two to ten feet long, comprising a series of lantern slides printed on the film.

My invention provides a means for projecting a small coil of film without using a reel and without the necessity of rewinding before it is ready to project again. The film is projected by placing it in a container mounted at an angle on the top of the projector and the beginning of the film (in the center of the coil) is led down through the bottom of the container and past the projector. As the film is fed through the projector, the coil of film in the container revolves with the least amount of friction. The film after passing through the projector is wound up on a spindle, from which is can be withdrawn and stored in a suitable container for future use.

I am aware that non-rewind motion picture projectors have been made, but in all these cases the film is wound on a spool or reel, usually of special and costly construction, which revolves with the film. This is necessary when using a coil of film 500 or 1,000 feet long for the usual motion picture projector, but in a single picture projector, using seldom over 10 foot coils. it is possible to avoid the use of a reel by this film feeding device. The great advantage of a non-rewind mechanism is that the user of this type of projector seldom has any mechanical means for rewinding film, such as used for motion pictures, and to roll a ten foot film into a small coil or onto a small reel by hand requires some skill and patience to avoid finger-marking. Film is easily soiled by handling so that after comparatively little use the film is ruined.

By my invention, by a simple and inexpensive means, the film is saved this handling and the operation of the projector quickened, and the film is always ready to project.

My invention is illustrated in the accompanying drawing of which Fig. 1 is a side elevation partly in section: Fig. 2 is a front elevation: Fig. 3 is a section through the film feeding container: Fig. 4 is a bottom view of the container.

The coil of film is placed in the open container 2, comprising a hollow cylindrical shell open at both ends and mounted with its axis at an oblique angle at the top of the projector. Guide roller 3 is mounted inside the coil of film and serves to hold it in place. The coil of film is wound with the beginning of the film in the center, which is drawn out through the bottom of the container, as indicated at 1, over the guide 19, past the aperture plate onto the teeth on the feed sprocket 11, and finally to the take-up spool 15, the end of the film being caught in the slot 16.

To allow the freest movement of the film the periphery of the container is mounted to turn in relation to the base as the film is drawn out. If the periphery of the container was fixed, the outside of the film would rub against it and scratch or wear the film. To permit such rotation of the container the latter is provided with an outwardly extending flange 20, engaged by an internally grooved ring 21 forming a stationary base which is supported on the film-projecting machine by a vertical bracket 22. the upper part of which bracket is bent at an oblique angle to support the film container with its own axis at an oblique angle to the path of the film through the projecting machine. This further simplifies the magazine construction, since it makes it possible to use only one inclined pin (as 19) inclined to the axis of the container, to guide the film toward the open base of the container. The guides 3 and 19 are preferably mounted on the strap or bridge 18 extending across the bottom of the container. The bridge is extended or bent outwardly. as indicated at 23, Fig. 3, to support the guide pin 19 at an oblique angle to the axis of the container.

The sprocket 11 is preferably driven by a Geneva movement, comprising a star wheel 12, mounted on the same shaft as the sprocket. The pin wheel 13. driven by the hand crank 14, is mounted to turn the star wheel one-fourth of a revolution, or one picture space or frame, for each turn of the hand crank. The take-up spool 15 is operated from the sprocket shaft by means of spring belt 17.

The optics of the projector which are only indicated diagrammatically comprise the lamp 7, reflector 8, and projecting lens 10.

The film is held flat against the glass plate 24 by spring 6. The picture is framed by the aperture plate 9.

It is understood that any type of film feeding mechanism or any optical projecting system may be used.

I claim—

1. In a film magazine for moving picture machines, comprising a cylindrical container open at its lower end and having a radial flange at its open end, a stationary ring forming a base engaging said flange to support the container and permit rotation thereof about its axis, and means carried by the base and extending into the flanged open end of the container for guiding the film through said base.

2. A film magazine as described in claim 1, in combination with a projecting machine and means for supporting the base of the container thereon with the axis of the container at an oblique angle to the path of the film through the projecting machine.

3. A film magazine for moving picture machines, comprising a cylindrical container open at both ends and having an outwardly extending flange at one end, a bearing ring having an internal circumferential groove in which the flange is seated to support the container and permit rotation thereof about its axis, a support for the ring, a bridge spanning the ring and having an outwardly extending portion, and a film guide pin carried by the outwardly extending portion of the bridge and extending into the container at an acute angle to the axis of the container.

Signed at New York city in the county of New York and State of New York this 27th day of February A. D. 1925.

PERCY DOUGLAS BREWSTER.